(12) United States Patent
Ichihara et al.

(10) Patent No.: US 6,738,698 B2
(45) Date of Patent: May 18, 2004

(54) APPARATUS FOR AND METHOD OF CONTROLLING ELECTRONIC SYSTEM FOR MOVABLE BODY, ELECTRONIC SYSTEM FOR MOVABLE BODY, PROGRAM STORAGE DEVICE AND COMPUTER DATA SIGNAL EMBODIED IN CARRIER WAVE

(75) Inventors: Naohiko Ichihara, Tsurugashima (JP); Shinichi Gayama, Tsurugashima (JP); Hiroaki Shibasaki, Tokyo-to (JP); Hideki Amano, Tokyo-to (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/164,404

(22) Filed: Jun. 10, 2002

(65) Prior Publication Data

US 2002/0188390 A1 Dec. 12, 2002

(30) Foreign Application Priority Data

Jun. 11, 2001 (JP) ........................................ 2001-175577

(51) Int. Cl.⁷ .................... G06F 165/00; G06G 7/76; G01C 21/00
(52) U.S. Cl. .................... 701/36; 701/200; 340/994
(58) Field of Search .................. 701/36, 200, 209, 701/213, 117, 210, 204, 207, 208; 73/178 R; 340/994, 993, 995.21; 342/357.1, 457, 357.07; 455/456.1

(56) References Cited

U.S. PATENT DOCUMENTS

| | | | | | |
|---|---|---|---|---|---|
| 5,751,245 | A | * | 5/1998 | Janky et al. | 342/357 |
| 5,987,377 | A | * | 11/1999 | Westerlage et al. | 701/204 |
| 6,101,443 | A | * | 8/2000 | Kato et al. | 701/210 |
| 6,209,026 | B1 | * | 3/2001 | Ran et al. | 709/218 |
| 6,363,323 | B1 | * | 3/2002 | Jones | 701/213 |
| 6,526,349 | B2 | * | 2/2003 | Bullock et al. | 701/209 |

* cited by examiner

Primary Examiner—Tan Q. Nguyen
Assistant Examiner—Dalena Tran
(74) Attorney, Agent, or Firm—Sughrue Mion, PLLC

(57) ABSTRACT

An electronic system has (i) an information outputting apparatus having an output device for outputting a content information including at least one of an audio information and a video information and (ii) a navigation apparatus having an input device for inputting a destination in a movement of a movable body and a calculate device for calculating a necessary time length required for the movable body to arrive at the destination. A controlling apparatus is provided with: a selecting device for selecting the content information to be outputted during the movement of the movable body until the arrival at the destination, on the basis of an output time length information indicative of a time length required to output the content information, in response to the calculated necessary time length; and an output controlling device for controlling the output device so as to output the content information selected by the selecting device.

35 Claims, 8 Drawing Sheets

APPARATUS FOR AND METHOD OF CONTROLLING ELECTRONIC SYSTEM FOR MOVABLE BODY, ELECTRONIC SYSTEM FOR MOVABLE BODY, PROGRAM STORAGE DEVICE AND COMPUTER DATA SIGNAL EMBODIED IN CARRIER WAVE

BACKGROUND OF THE INVENTION

1. Field of the Invention

The present invention relates to an apparatus for and a method of controlling an electronic system for a movable body, which includes an information outputting apparatus for a movable body installed within a car, such as a car audio system and the like, and a navigation apparatus for a movable body, such as an on-vehicle type. It also relates to an electronic system for a movable body, as well as a program storage device and a computer data signal embodiment in a carrier wave, which allow a computer to function as the above-mentioned controlling apparatus.

2. Description of the Related Art

An on-vehicle information outputting apparatus, such as a car audio system, a car stereo, a car television and the like, is designed so as to reproduce a signal from a CD (Compact Disc), a DVD, an MD (Mini Disc), a cassette tape or the like, and perform an audio-output and/or a video-output inside the car by using a speaker, a display device and the like which are installed within the car. Or, it is designed so as to receive an electric wave for a radio and a television, and demodulate it, and then perform an audio-output and/or a video-output inside the car.

On the other hand, the on-vehicle navigation apparatus is designed so as to display map data, current position data, various guide data and the like on a display device, and/or output a voice of a guide message, an alarm message or the like for the navigation by using a speaker installed within the car.

The information outputting apparatus and the navigation apparatus, which are intended to be installed within the same car, are typically designed so as to share the display device, the speaker and the like.

However, the information outputting apparatus and the navigation apparatus which are installed within the car have only the functions independent of each other. Input data for navigation (for example, destination data) and output data for navigation (for example, a time and a route required to arrive at a destination and the like) cannot be reflected in the audio and/or video output in the information outputting apparatus. For example, a driver or a fellow passenger, who inputs a destination and looks at a scheduled arrival time, a scheduled necessary time length or the like in the navigation apparatus, investigates appropriate audio information and/or video information corresponding to the necessary time length required to arrive at the destination or the like, and further sets or operates the information outputting apparatus so as to output the investigated audio and/or video information. Finally, it is possible to output the audio and/or video information appropriate to a traveling state or a scheduled traveling state of the self-car. However, it is very troublesome and difficult for the driver or the fellow passenger already riding in the car to select a series of audio information (for example, a music album, a collection of songs of the same artist, one radio program and the like) or a series of video information (for example, one movie, one electronic book, one television program and the like) that ends a little before the arrival at the destination. Thus, the human work itself, such as the above-mentioned selection of the audio and/or video information appropriate for the traveling state of the self-car, is hardly carried out in reality.

As mentioned above, there is a problem that if the various electronic apparatuses in the recent years are commonly used, or even if the navigation apparatus and the information outputting apparatus for the movable body which are established within the electronic system for the same movable body are used, the audio information and/or the video information appropriate for the traveling state of the self-car cannot be outputted.

SUMMARY OF THE INVENTION

The present invention is proposed in view of the above mentioned problems. It is therefore an object of the present invention to provide an apparatus for and a method of controlling an electronic system for a movable body, which can control the electronic system for the movable body which includes an information outputting apparatus for the movable body and a navigation apparatus for the movable body so that audio information and/or the video information appropriate for the traveling state of the movable body can be outputted, and an electronic system for a movable body having such a control apparatus, as well as a program storage device and a computer data signal embodiment in a carrier wave, which allow a computer to function as the controlling apparatus.

The above object of the present invention can be achieved by a first controlling apparatus for controlling an electronic system for a movable body, the electronic system provided with (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by the input device from a current position of the movable body, the first controlling apparatus provided with: a selecting device which selects the content information to be outputted during the movement of the movable body until the arrival at the destination, on the basis of an output time length information indicative of a time length required to output the content information, in response to the calculated necessary time length; and an output controlling device which controls the output device so as to output the content information selected by the selecting device during the movement of the movable body until the arrival at the destination.

According to the first controlling apparatus, in the electronic system for the movable body, the content information including the video information is displayed on a picture plane of a display device, which is equipped in the information outputting apparatus such as a car audio system, a car stereo system, a car TV system, a portable TV system or the like. Alternatively, the content information including the audio information is sound-outputted from a speaker mounted on the car, a headphone of the portable audio system or the like. At this time, as the video information, there are movies, dramas, animations or the like, which are reproduced from a record medium such as a CD, a DVD, a hard disc etc., or which are radio-wave-received and demodulated, as well as the text information etc., which are image-formed to be displayed. As the audio information, there are the music compositions, which are reproduced from a record medium such as a CD, a DVD, a hard disc etc., or which are radio-wave-received and demodulated, as well as the audio information accompanying the video information, the text information which are made into the sound or the like. Incidentally, in the present invention, the information which can be outputted in an arbitrary form to the driver or the fellow passenger or the moving person by the information outputting apparatus, including those video information and audio information, is called as the "content information". Also in the present invention, the "movable body" has a broad meaning, which means a not only a car, auto mobile or vehicle, a ship, an airplane or the like, on which the information outputting apparatus and the navigation apparatus for the movable body is mounted, but also a human being which walks and carries the electronic system for the movable body or the information outputting apparatus and the navigation apparatus for the movable body.

On the other hand, in the electronic system for the movable body, the navigation apparatus measures the current position by the GPS (Global Positioning System) measurement and/or the self-sustained or dead-reckoning positioning measurement. Then, it may calculate an optimum route to a destination from the current position to thereby display the optimum route. It may display the map information at the vicinity of the current position on the display device, and may superimpose a current position mark on the displayed map information. The navigation apparatus of the present invention is at least provided with (i) an input device through which the destination in the movement of the movable body can be inputted, such as a key, a mouse, a touch panel, an voice-inputting device or the like, and (ii) a calculate device such as a CPU (Central Processing Unit) which calculates the necessary time length to arrive at the destination from the current position.

Especially, by the selecting device, the content information to be outputted during the movement of the movable body until the arrival at the destination is selected in response to the calculated necessary time length, on the basis of the output time length information indicative of the time length required to output the content information, which may be stored in a memory or may be down-loaded from a database through the communication device for example. For example, a music album having a recording time length, which is same as or slightly shorter than the calculated necessary time length, may be selected, or the movie having the recording time length, which is same as or slightly shorter than the calculated necessary time length may be selected. Further, a play list indicating the combination of a plurality of content information, which include a plurality of music compositions and which are supposed to be completed within the necessary time length, is constructed by taking out music compositions and/or the pictures belonging to the favorite genre or artist, which are set in advance depending upon the driver's or fellow passenger's favorite, from the content information stored in advance, or by down-loading them from the data base through the communication device. Alternatively, the electronic book etc., or the stories or the like recorded on a tape and having the appropriate length to be read within the necessary time length may be selected. The radio program or TV program which is completed within the necessary time length may be selected, in consideration with the current time point by referring to the built-in clock. After that, during the movement of the movable body until arriving at the destination, the output device outputs the content information selected by the selecting device, under the control of the output controlling device. Therefore, the content information appropriate for the necessary time length scheduled by the navigation apparatus is outputted during the movement of the movable body, and then, the output of the content information is completed or is ended at a timing of a suitable interruption.

In this manner, it becomes possible to perform the audio output and/or video output appropriate for the movement state or progress of the movable body in the electronic system for the movable body including the navigation apparatus and the information outputting apparatus.

In one aspect of the first controlling apparatus of the present invention, the first controlling apparatus is further provided with a monitoring device which monitors whether or not the movement of the movable body is on schedule, the selecting device applying a change onto the content information to be applied after a current time point if the movement of the movable body is not on schedule according to a monitor result of the monitoring device.

According to this aspect, the selecting device applies the change onto the content information to be outputted after the current time point, in case that the movement of the movable body is not on the schedule, i.e., if the movable body seems to arrive at the destination ahead of the schedule or behind the schedule, according to the monitor result of the monitoring device. For example, in case that the movable body seems to arrive ahead of the schedule, a music composition in the middle of the music album consisting of a plurality of music compositions may be skipped. Or, in case that the movable body seems to arrive behind the schedule, a music album similar to the music album being reproduced (e.g., the music composition related to the same genre or the same artist) may be inserted into the play list. Therefore, when arriving at the destination after that, the output of the content information, onto which the change has been applied, is completed or is ended at a timing of a suitable interruption, even if the movable body cannot move on the schedule due to a traffic jam, a side trip or the like.

Alternatively, in another aspect of the first controlling apparatus of the present invention, the first controlling apparatus is further provided with a monitoring device which monitors whether or not the movement of the movable body is on schedule, the output controlling device controlling the output device to apply a change onto an output manner thereof after a current time point if the movement of the movable body is not on schedule according to a monitor result of the monitoring device.

According to this aspect, the output controlling device controls the output device to apply the change onto the output manner thereof after the current time point, in case that the movement of the movable body is not on the schedule, i.e., if the movable body seems to arrive at the destination ahead of the schedule or behind the schedule, according to the monitor result of the monitoring device. For example, in case that the movable body seems to arrive ahead of the schedule, the audio information and/or video information being reproduced may be fast-forward-reproduced or double-speed-reproduced. Or, in case that the movable body seems to arrive behind the schedule, the audio information and/or video information being reproduced may be still-picture-reproduced or slowly-reproduced. Therefore, when arriving at the destination after that, the output of the content information, onto whose output manner the change has been applied, is completed or is ended at a timing of a suitable interruption, even if the movable body cannot move on the schedule due to a traffic jam, a side trip or the like.

In this manner, in the electronic system for the movable body including the information outputting apparatus and the navigation apparatus, even if the traveling state is behind or ahead of the schedule due to the traffic jam etc., it is possible to perform the audio output and/or the video output appropriate for the movement state of the movable body.

In the above mentioned aspect in which the monitoring device monitors and the selecting device applies the change, the calculating device may further calculate scheduled pass time points at a plurality of geographical positions on a route of the movable body, the monitoring device may monitor by comparing the scheduled pass time points with a current time point, and the selecting device may apply the change onto the content information to be outputted after the current time point in correspondence with a comparison result of the monitoring device.

By constructing in this manner, it is possible to surely monitor whether the movement of the movable body is on schedule, as the monitoring device compares the scheduled pass time points obtained by the calculating device with the current time point obtained by the built-in clock or the like. Then, in correspondence with the comparison result of the monitoring device, the selecting device applies the change onto the content information to be outputted after the current time point.

In the above mentioned aspect in which the monitoring device monitors and the output device applies the change, the calculating device may further calculate scheduled pass time points at a plurality of geographical positions on a route of the movable body, the monitoring device may monitor by comparing the scheduled pass time points with a current time point, and the output controlling device may control the output device to apply the change onto the output manner thereof after the current time point in correspondence with a comparison result of the monitoring device.

By constructing in this manner, it is possible to surely monitor whether the movement of the movable body is on schedule, as the monitoring device compares the scheduled pass time points obtained by the calculating device with the current time point obtained by the built-in clock or the like. Then, in correspondence with the comparison result of the monitoring device, the output device applies the change onto the output manner thereof after the current time point.

In the above mentioned aspect in which the monitoring device monitors and the selecting device applies the change, the calculating device may further calculate scheduled pass positions at a plurality of time points, on a route of the movable body, the monitoring device may monitor by comparing the scheduled pass positions with a current position, and the selecting device may apply the change onto the content information to be outputted after the current time point in correspondence with a comparison result of the monitoring device.

By constructing in this manner, it is possible to surely monitor whether the movement of the movable body is on schedule, as the monitoring device compares the scheduled pass time positions obtained by the calculating device with the current position obtained by the navigation apparatus or the like Then, in correspondence with the comparison result of the monitoring device, the selecting device applies the change onto the content information to be outputted after the current time point.

In the above mentioned aspect in which the monitoring device monitors and the output device applies the change, the calculating device may further calculate scheduled pass positions at a plurality of time points, on a route of the movable body, the monitoring device may monitor by comparing the scheduled pass positions with a current position, and the output controlling device may control the output device to apply the change onto the output manner thereof after the current time point in correspondence with a comparison result of the monitoring device.

By constructing in this manner, it is possible to surely monitor whether the movement of the movable body is on schedule, as the monitoring device compares the scheduled pass time positions obtained by the calculating device with the current position obtained by the navigation apparatus or the like. Then, in correspondence with the comparison result of the monitoring device, the output device applies the change onto the output manner thereof after the current time point.

In another aspect of the first controlling apparatus of the present invention, the first controlling apparatus is further provided with a storage device which stores the output time length information.

According to this aspect, as the storage device e.g., a hard disc unit or the like stores the output time length information in advance, the selecting device can surely and speedily select the content information while referring to the output time length information stored in the storing device.

In this aspect provided with the storage device, the storage device may store the content information in correlation with the output time length information.

By constructing in this manner, the selecting device can surely and speedily select the stored content information while referring to the stored output time length information, by storing the output time length information and each content information in correlation therewith in the storing device such as a hard disc unit or the like. For example, the output time length information may be recorded at a header of each content information, or the output time length information with respect to each content information may be recorded in a table format.

In another aspect of the first controlling apparatus of the present invention, the input device is adapted to input a condition to narrow down the content information to be outputted during the movement of the movable body, and the selecting device selects the content information in correspondence with the condition inputted by the inputting device in addition to the necessary time length.

According to this aspect, by inputting through the input device the condition to narrow down the content information to be outputted during the movement of the movable body e.g., the condition of the artist name, the genre name, the album name, the taste, the purpose of traveling, the kind of the fellow passengers or the like, the selecting device selects the content information in correspondence with the inputted condition or conditions in addition to the necessary time length when selecting the content information. Thus, it is possible to output the audio and/or video information appropriate for the necessary time length, which is the content information corresponding to the taste or favorite of the driver or the fellow passenger who operates the input device.

In another aspect of the first controlling apparatus of the present invention, the first controlling apparatus is further provided with a condition setting device which sets a condition to narrow down the content information to be outputted during the movement of the movable body, on the basis of history information related to the content information outputted in a past by the information outputting apparatus, the selecting device selecting the content information in correspondence with the condition set by the condition setting device, in addition to the necessary time length.

According to this aspect, the condition to narrow down the content information to be outputted during the movement of the movable body is set by the condition setting device, in advance of or almost simultaneous to the selection of the selecting device, on the basis of the history information related to the content information outputted in the past. Then, the selecting device selects the content information in correspondence with the set condition or conditions in addition to the necessary time length. Thus, it is possible to output the audio and/or video information appropriate for the necessary time length, which is the content information corresponding to the taste or favorite of the driver or the fellow passenger who operates the information output device.

In another aspect of the present invention, the first controlling apparatus is further provided with a situation detecting device which detects a special situation in a predetermined kind during the movement of the movable body, the output controlling device controlling the output device to preferentially output the content information set in advance as to be outputted at a time of the special situation regardless of a selection result by the selecting device, if the special situation is detected by the situation detecting device.

According to this aspect, the content information to be outputted at the time of the special situation e.g., the situation in which the driver is tired, the situation in which the driver is sleepy, is set in advance. For example, with respect to the special situation in which the driver is tired, a music composition for alleviating the fatigue as a default value in accordance with a typical viewpoint of a human physiology is set in advance. Or, a music composition for alleviating the fatigue on the basis of the judgment of the driver or the like is set in advance. With respect to the special situation in which the driver is sleepy, the music composition to shake off the sleepiness is set in advance. After that, during the movement of the movable body, when this special situation is detected by the situation detecting device, the output device preferentially outputs the content information set in advance as the one to be outputted at the time of special situation regardless of the selection result of the selecting device, under the control of the output controlling device. Therefore, under the special situation, the content information appropriate for the specific situation is outputted to the driver etc., in place of the content information selected in response with the necessary time length. Thus, the movement circumstance which is relatively safe and comfortable for the driver etc., can be established. As for the timing of changing the output from the output device to the content information appropriate for the special situation, the switching may be done immediately after the situation detecting device detects the special situation, or may be done with waiting for a suitable division of the content information being currently outputted.

The above object of the present invention can be also achieved by a second controlling apparatus for controlling an electronic system for a movable body, the electronic system provided with (i) an information outputting apparatus having an output device which outputs a content information including at least one of an audio information and a video information and (ii) a navigation apparatus having an measurement device which outputs a measurement data related to a movement condition of a movable body, the second controlling apparatus provided with: a situation detecting device which detects a special situation in a predetermined kind during the movement of the movable body, on the basis of the measurement data; and an output controlling device which controls the output device to preferentially output the content information set in advance as to be outputted at a time of the special situation if the special situation is detected by the situation detecting device.

According to the second controlling apparatus, in the electronic system for the movable body, the content information including the video information may be displayed on a picture plane of a display device, which is equipped in the information outputting apparatus, while the content information including the audio information may be sound-outputted from a speaker. On the other hand, in the electronic system for the movable body, the measurement device of the navigation apparatus measures the current position by the GPS measurement and/or the self-sustained or dead-reckoning positioning measurement. The measurement device also outputs the measurement data related to the movement condition such as a velocity, an angular velocity, an acceleration, a moving azimuth, a locus or the like. Then, the navigation apparatus may calculate an optimum route to a destination from the current position to thereby display the optimum route. It may display the map information at the vicinity of the current position on the display device, and may superimpose a current position mark on the displayed map information.

Then, the content information to be outputted at the time of the special situation e.g., the situation in which the driver is tired, the situation in which the driver is sleepy, is set in advance. For example, with respect to the special situation in which the driver is tired, a music composition for alleviating the fatigue as a default value in accordance with a typical viewpoint of a human physiology is set in advance. Or, a music composition for alleviating the fatigue on the basis of the judgment of the driver or the like is set in advance. With respect to the special situation in which the driver is sleepy, the music composition to shake off the sleepiness is set in advance. After that, during the movement of the movable body, when this special situation is detected by the situation detecting device, the output device preferentially outputs the content information set in advance as the one to be outputted at the time of special situation regardless of the selection result of the selecting device, under the control of the output controlling device. Therefore, under the special situation, the content information appropriate for the specific situation is outputted to the driver etc., in place of the content information selected in response with the necessary time length. Thus, the movement circumstance which is relatively safe and comfortable for the driver etc., can be established.

In one aspect of the second controlling apparatus of the present invention, the second controlling apparatus is further provided with an input device through which the content information to be outputted can be inputted at the time of the special situation.

According to this aspect, since the content information to be outputted in the special situation can be easily set through the input device, in line with the intension or desire of the driver, the fellow passenger or the like, it is practically convenient.

In another aspect of the second controlling apparatus of the present invention, the situation detecting device detects the special situation by detecting that a continuous movement time length since a start of the movement of the movable body exceeds a predetermined time length.

According to this aspect, the detection of the situation detecting device is performed by assuming such a situation that the continuous movement exceeds the predetermined time length e.g., two hours, as the special situation in which the driver, the fellow passenger or the like is tired.

In another aspect of the second controlling apparatus of the present invention, the situation detecting device detects the special situation on the basis of a degree of a traffic jam on a route where the movable body has already traveled.

According to this aspect, the detection of the situation detecting device is performed by assuming such a situation that the movement is continued through a traffic jam for more than a predetermined time length, as the special situation in which the driver, the fellow passenger or the like is tired.

In another aspect of the second controlling apparatus of the present invention, the situation detecting device detects the special situation by detecting that a traveling locus of the movable body is abnormal with respect to a predetermined reference.

According to this aspect, the detection of the situation detecting device is performed by assuming such a situation that the traveling locus is abnormal e.g., a meandering drive, an emergently handling action or the like, as the special situation in which the driver is sleepy.

The above object of the present invention can be achieved by a first program storage device readable by a computer for tangibly embodying a program of instructions executable by the computer to perform method processes in an electronic system for a movable body, the electronic system provided with (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by the input device from a current position of the movable body, the method processes provided with: a selecting process of selecting the content information to be outputted during the movement of the movable body until the arrival at the destination, on the basis of an output time length information indicative of a time length required to output the content information, in response to the calculated necessary time length; and an outputting process of outputting the content information selected by the selecting process during the movement of the movable body until the arrival at the destination.

According to the first program storage device, the above described first controlling apparatus for the electronic system can be relatively easily realized as a computer reads and executes the program of instructions from the program storage device such as a CD-ROM (Compact Disc—Read Only Memory), a DVD-ROM (DVD Read Only Memory), a hard disc or the like, or as it executes the program of instructions after downloading the program through communication device. Moreover, the program of instructions can be sent from a server device together with an application program required for the navigation or the audio and/or video outputting, or other data such as map data, audio information data, video information data and so on.

The above object of the present invention can be achieved by a second program storage device readable by a computer for tangibly embodying a program of instructions executable by the computer to perform method processes in an electronic system for a movable body, the electronic system provided with (i) an information outputting apparatus having an output device which outputs a content information including at least one of an audio information and a video information and (ii) a navigation apparatus having an measurement device which outputs a measurement data related to a movement condition of a movable body, the method processes provided with: a situation detecting process of detecting a special situation in a predetermined kind during the movement of the movable body, on the basis of the measurement data; and an outputting process of preferentially output the content information set in advance as to be outputted at a time of the special situation if the special situation is detected by the situation detecting process.

According to the second program storage device, the above described second controlling apparatus for the electronic system can be relatively easily realized as a computer reads and executes the program of instructions from the program storage device or as it executes the program of instructions after downloading the program through communication device.

The above object of the present invention can be achieved by a first computer data signal embodied in a carrier wave and representing a series of instructions which cause a computer to perform method processes in an electronic system for a movable body, the electronic system provided with (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by the input device from a current position of the movable body, the method processes provided with: a selecting process of selecting the content information to be outputted during the movement of the movable body until the arrival at the destination, on the basis of an output time length information indicative of a time length required to output the content information, in response to the calculated necessary time length; and an outputting process of outputting the content information selected by the selecting process during the movement of the movable body until the arrival at the destination.

According to the first computer data signal embodied in the carrier wave of the present invention, as the computer downloads the program in the computer data signal through a computer network or the like, and executes this program, it is possible to realize the above described first controlling apparatus for the electronic system of the present invention.

The above object of the present invention can be achieved by a second computer data signal embodied in a carrier wave and representing a series of instructions which cause a computer to perform method processes in an electronic system for a movable body, the electronic system provided with (i) an information outputting apparatus having an output device which outputs a content information including at least one of an audio information and a video information and (ii) a navigation apparatus having an measurement device which outputs a measurement data related to a movement condition of a movable body, the method processes provided with: a situation detecting process of detecting a special situation in a predetermined kind during the movement of the movable body, on the basis of the measurement data; and an outputting process of preferentially output the content information set in advance as to be outputted at a time of the special situation if the special situation is detected by the situation detecting process.

According to the second computer data signal embodied in the carrier wave of the present invention, as the computer downloads the program in the computer data signal through a computer network or the like, and executes this program, it is possible to realize the above described second controlling apparatus for the electronic system of the present invention.

The above object of the present invention can be achieved by a first electronic system for a movable body provided with: an information outputting apparatus having an output device which outputs a content information including at least one of an audio information and a video information; a navigation apparatus having an input device through which a destination in a movement of a movable body can be inputted and a calculate device which calculates a necessary time length required for the movable body to arrive at the destination inputted by the input device from a current position of the movable body; a selecting device which selects the content information to be outputted during the movement of the movable body until the arrival at the destination, on the basis of an output time length information indicative of a time length required to output the content information, in response to the calculated necessary time length; and an output controlling device which controls the output device so as to output the content information selected by the selecting device during the movement of the movable body until the arrival at the destination.

According to the first electronic system of the present invention, since it is provided with the above described first controlling apparatus of the present invention, it is possible to perform the audio output and/or the video output appropriate for the movement situation of the movable body.

In one aspect of the first electronic system of the present invention, the first electronic system is further provided with a communication device which down-loads at least one of the content information and the output time length information.

According to this aspect, since at least one of the content information and the output time length information can be down-loaded by the communication device e.g., a portable telephone, such a circumstance that the content information corresponding to the necessary time length can be selected and be outputted, can be relatively simply and easily obtained.

The above object of the present invention can be also achieved by a second electronic system for a movable body provided with: an information outputting apparatus having an output device which outputs a content information including at least one of an audio information and a video information; a navigation apparatus having an measurement device which outputs a measurement data related to a movement condition of a movable body; a situation detecting device which detects a special situation in a predetermined kind during the movement of the movable body, on the basis of the measurement data; and an output controlling device which controls the output device to preferentially output the content information set in advance as to be outputted at a time of the special situation if the special situation is detected by the situation detecting device.

According to the second electronic system of the present invention, since it is provided with the above described second controlling apparatus of the present invention, it is possible to perform the audio output and/or the video output appropriate for the movement situation of the movable body.

In one aspect of the second electronic system of the present invention, the electronic system further comprises a communication device which down-loads the content information.

According to this aspect, it is possible to preferentially output the content information suitable for the special situation, which is down-loaded from a server having the content information for various special situations or the like.

The above object of the present invention can be also achieved by a first controlling method of controlling an electronic system for a movable body, the electronic system provided with (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by the input device from a current position of the movable body, the first controlling method provided with: a selecting process of selecting the content information to be outputted during the movement of the movable body until the arrival at the destination, on the basis of an output time length information indicative of a time length required to output the content information, in response to the calculated necessary time length; and an outputting process of outputting the content information selected by the selecting process during the movement of the movable body until the arrival at the destination.

According to the first controlling method of the present invention, in the same manner as the above described first controlling apparatus for the electronic system of the present invention, it is possible to perform the audio output and/or the video output appropriate for the movement situation of the movable body, in the electronic system for the movable body including the information outputting apparatus and the navigation apparatus.

The above object of the present invention can be also achieved by a second controlling method of controlling an electronic system for a movable body, the electronic system provided with (i) an information outputting apparatus having an output device which outputs a content information including at least one of an audio information and a video information and (ii) a navigation apparatus having an measurement device which outputs a measurement data related to a movement condition of a movable body, the second controlling method provided with: a situation detecting process of detecting a special situation in a predetermined kind during the movement of the movable body, on the basis of the measurement data; and an outputting process of preferentially output the content information set in advance as to be outputted at a time of the special situation if the special situation is detected by the situation detecting process.

According to the second controlling method of the present invention, in the same manner as the above described second controlling apparatus for the electronic system of the present invention, it is possible to perform the audio output and/or the video output appropriate for the movement situation of the movable body, in the electronic system for the movable body including the information outputting apparatus and the navigation apparatus.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. The respective embodiments as described below are designed such that an electronic system for a movable body according to the present invention is established as an on-vehicle electronic system.

(First Embodiment)

At first, an on-vehicle electronic system according to a first embodiment is described with reference to FIG. 1 to FIG. 4.

Figure 1:
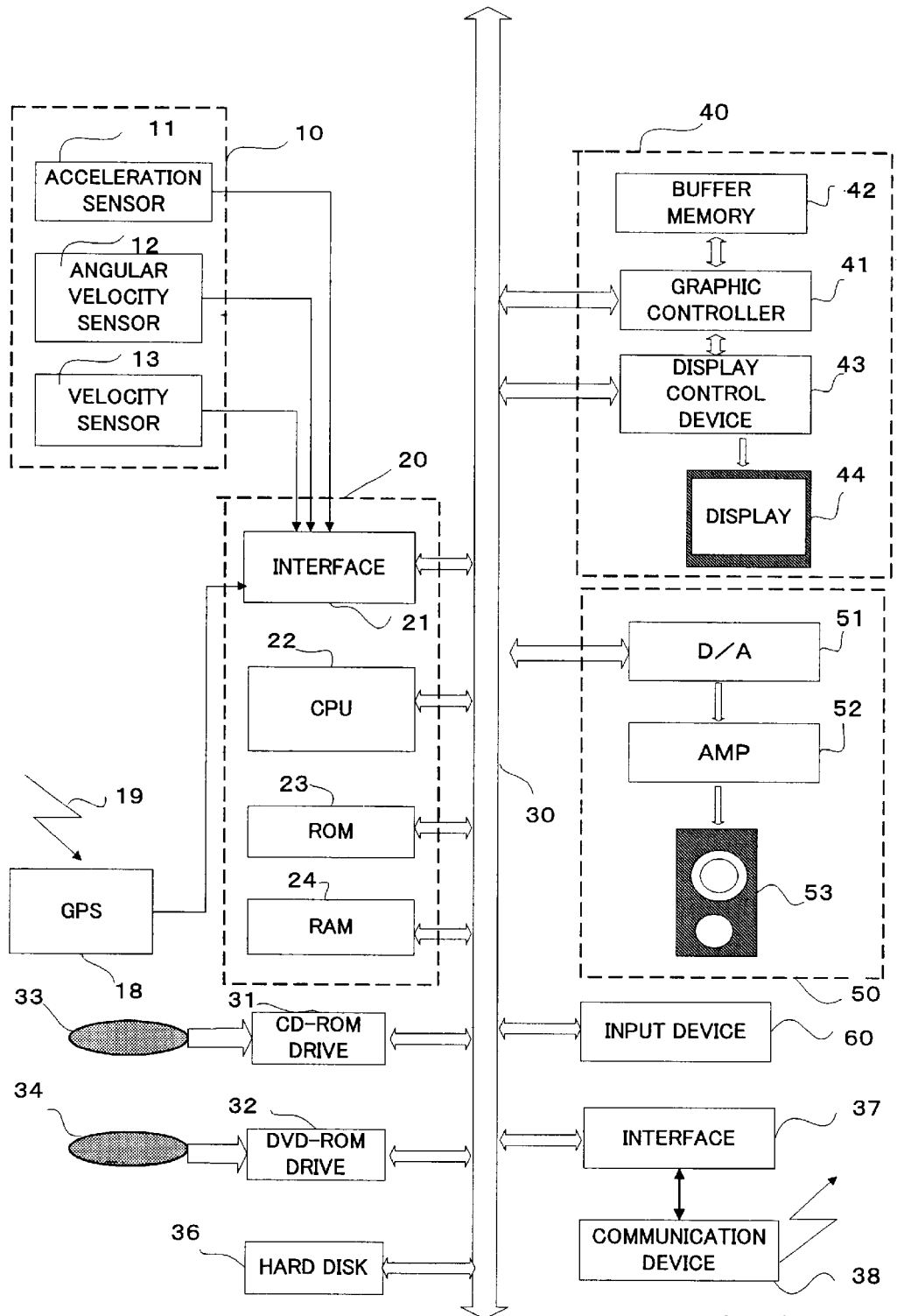
FIG. 1 is a block diagram showing a configuration of an on-vehicle electronic system, according to a first embodiment of the present invention.

As shown in FIG. 1, the on-vehicle electronic system in this embodiment is provided with a self-sustained positioning device 10 (i.e., a dead-reckoning or built-in positioning device), a GPS (Global Positioning System) receiver 18, a system controller 20, a CD-ROM drive 31, a DVD-ROM drive 32, a hard disc device 36, a communication interface 37, a communication device 38, a display device 40, an audio output device 50 and an input device 60.

The self-sustained positioning device 10 is composed of an acceleration sensor 11, an angular velocity sensor 12 and a velocity sensor 13. The acceleration sensor 11 is composed of, for example, a piezoelectric element, and it detects an acceleration of a car, and then outputs an acceleration data. The angular velocity sensor 12 is composed of, for example, a vibration gyroscope, and it detects an angular velocity of a car when a direction of the car is changed, and then outputs an angular velocity data and a relative azimuth data.

The velocity sensor 13 is composed of a car velocity sensor for detecting a rotation of a shaft of the car mechanically, magnetically or optically, and then generating a car speed pulse, which is a pulse signal, for each rotation of a predetermined angle in the shaft.

The GPS receiver 18 is a device for receiving electric waves 19 to send down link data including positioning data from a plurality of GPS satellites to be used to detect an absolute position of the self-car on the basis of latitude and longitude information and the like.

The system controller 20 includes an interface 21, a CPU (Central Processing Unit) 22, a ROM (Read Only Memory) 23 and a RAM (Random Access Memory) 24, and it is configured so as to control the on-vehicle electronic system as a whole.

The interface 21 carries out the interface operations between the acceleration sensor 11, the angular velocity sensor 12 and the velocity sensor 13 and the GPS receiver 18. From them, the interface 21 inputs the car speed pulse, the acceleration data, the relative azimuth data, the angular velocity data, the GPS positioning data, the absolute azimuth data and the like to the system controller 20. The CPU 22 controls the system controller 20 as a whole. The ROM 23 has a non-volatile memory (not shown) for storing therein a control program to control the system controller 20 and the like. The RAM 24 stores various data, such as a route data and the like, at a readable condition, which are preset by a user through the input device 60, and provides a working area to the CPU 22.

The system controller 20, the CD-ROM drive 31, the DVD-ROM drive 32, the hard disc device 36, the communication interface 37, the display device 40, the audio output device 50 and the input device 60 are connected through a bus line 30 to each other.

The CD-ROM drive 31 and the DVD-ROM drive 32 read out the various data, such as a road data including a car lane number, a road width and the like, and the control programs corresponding to the later-described respective embodiments, respectively, from a CD 33 and a DVD 34, and output them, under the control of the system controller 20.

Moreover, the CD-ROM drive 31 and the DVD-ROM drive 32 read out the audio data and the video data constituting an example of content information, respectively, from the CD 33 and the DVD 34, under the control of the system controller 20.

By the way, as for the CD-ROM drive 31 and the DVD-ROM drive 32, it is allowable to install only one of them or a drive compatible with the CD and the DVD.

The hard disc device 36 stores therein the audio data and the video data read out from the CD-ROM drive 31 or the DVD-ROM drive 32, and the navigation data including a map data and the like. Thus, for example, while reading out the map data on the CD-ROM 33 or the DVD-ROM 34 and carrying out the navigation operation, the user can read out the audio data and/or the video data stored in the hard disc device 36 and can perform the audio output and/or the video output. Or, while reading out the audio data and/or the video data on the CD-ROM 33 and the DVD-ROM 34 and outputting the voice and/or the picture, the user can read out the map data stored in the hard disc device 36 and carry out the navigation operation. Moreover, the audio data, the video data, the map data or the like downloaded by the communication device 38 can be stored into the hard disc device 36. Then, it can be read out and outputted at any future time.

The communication device 38 is composed of, for example, a portable telephone, and it is designed so as to download the audio data, the video data, the map data and the like, or all of predetermined kinds of database with regard to them or a part thereof, through the communication interface 37 constituting a modem and the like.

The display device 40 displays various display data under the control of the system controller 20. The display device 40 is provided with: a graphic controller 41 for performing the entire control on the display device 40 in accordance with a control data sent from the CPU 22 through the bus line 30; a buffer memory 42, which is composed of memories such as VRAM (Video RAM) and the like, for transiently storing an instantly displayable video information; a display controller 43 for performing the display control on a display 44, such as a small LCD (Liquid Crystal Display), an EL (Electro-Luminescence) display, a CRT (Cathode Ray Tube) or the like, in accordance with the video data outputted by the graphic controller 41; and the display 44. The display 44 is a liquid crystal display in which a length of a diagonal line is, for example, about 5 to 10 inches, and it is fixed in the vicinity of a front panel within the car.

The audio output device 50 is composed of: a D/A (Digital to Analog) converter 51 for performing a D/A conversion on an audio digital data sent through the bus line 30 from the CD-ROM drive 31 or the DVD-ROM drive 32 or the RAM 24 or the like, under the control of the system controller 20; an amplifier (AMP) 52 for amplifying an audio analog signal outputted by the D/A converter 51; and a speaker 53 for converting the amplified audio analog signal into a voice and outputting it inside the car.

The input device 60 is composed of keys, switches, buttons, a remote controller, a voice input device and the like. The input device 60 is mounted around the display 44 and the front panel of the body in the on-vehicle electronic system installed within the car.

As mentioned above, in the on-vehicle electronic system in this embodiment, the navigation system is established which is provided with the self-sustained positioning device 10, the GPS receiver 18, the system controller 20, the CD-ROM drive 31, the DVD-ROM drive 32, the hard disc device 36, the communication interface 37, the communication device 38, the display device 40, the audio output device 50, the input device 60 and the like, and the car audio system is also established which is provided with the system controller 20, the CD-ROM drive 31, the DVD-ROM drive 32, the hard disc device 36, the communication interface 37, the communication device 38, the display device 40, the audio output device 50, the input device 60 and the like. That is, a plurality of constitutional elements are shared by the navigation system and the car audio system. As the entire on-vehicle electronic system, the total control is done by the system controller 20.

In addition, in the on-vehicle electronic system in this embodiment, a music composition database 100 is especially established within the hard disc device 36.

Figure 2A:
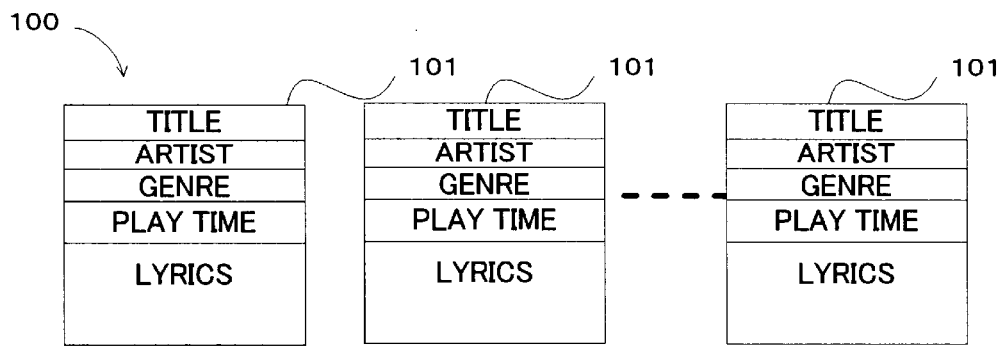
FIG. 2A is one conceptual view showing a data configuration in a music composition database used in the first embodiment.
Figure 2B:
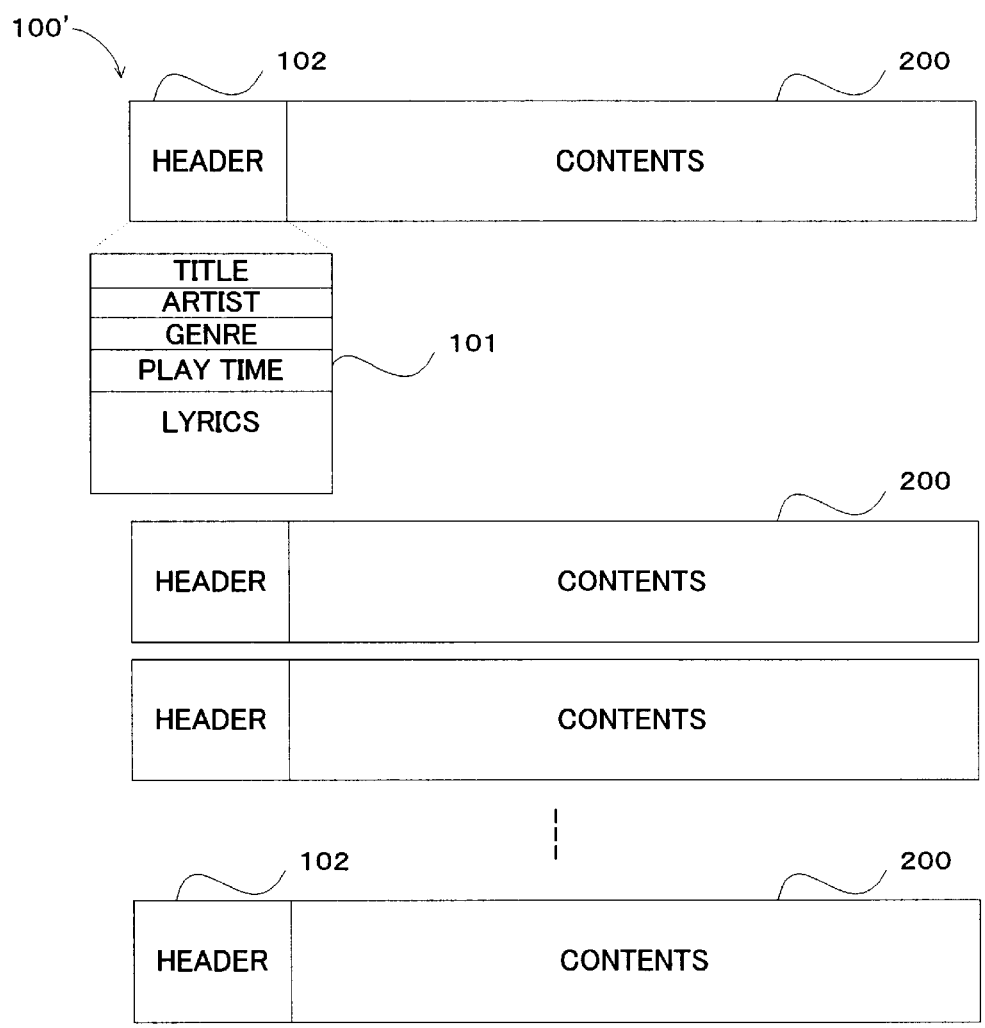
FIG. 2B is another conceptual view showing a data configuration in a music composition database used in the first embodiment.

For example, as shown in FIG. 2A, the music composition database 100 is prepared such that under the condition separated from the content information having the audio information to play the music composition, a large number of attribute information files 101 of a play time, a genre, a playing artist, words of a song and the like, are stored in correlation to, for example, titles of respective music compositions. Such a music composition database 100 can be obtained, for example, on the Internet. Or, as shown in FIG. 2B, a music composition database 100' having a plurality of content information 200 can be prepared by storing such attribute information files 101 in a header 102 of the content information 200 having the corresponding audio information.

However, instead of the establishment of the music composition database 100 or 100' in the hard disc device 36, or in addition to the establishment, it may be designed so as to access a music composition database established in a server and the like located at a remote position through the communication device 38, by using the system controller 20.

By the way, the on-vehicle electronic system can be naturally provided with various constitutional elements constituting a known car audio system and/or car television system, such as a radio antenna, a radio tuner, a television antenna, a television tuner, a cassette deck, an MD drive and the like, in addition to the constitutional elements shown in FIG. 1.

The data processing operations in the first embodiment and the later-described respective embodiments are mainly executed by the CPU 22 shown in FIG. 1. Actually, the computer program for controlling the navigation system, the computer program for controlling the car audio system and the computer program for controlling the database are mainly executed by the CPU 22. Then, the agent having various functions as described later is logically established within the CPU 22 by the computer program. Also, such computer programs may be stored in the ROM 23, the CD-ROM drive 33 or the DVD-ROM drive 34, and may be downloaded through the communication device 38 such as the modem, the portable telephone and the like to the RAM 42, the hard disc device 36 and the like.

Figure 3:
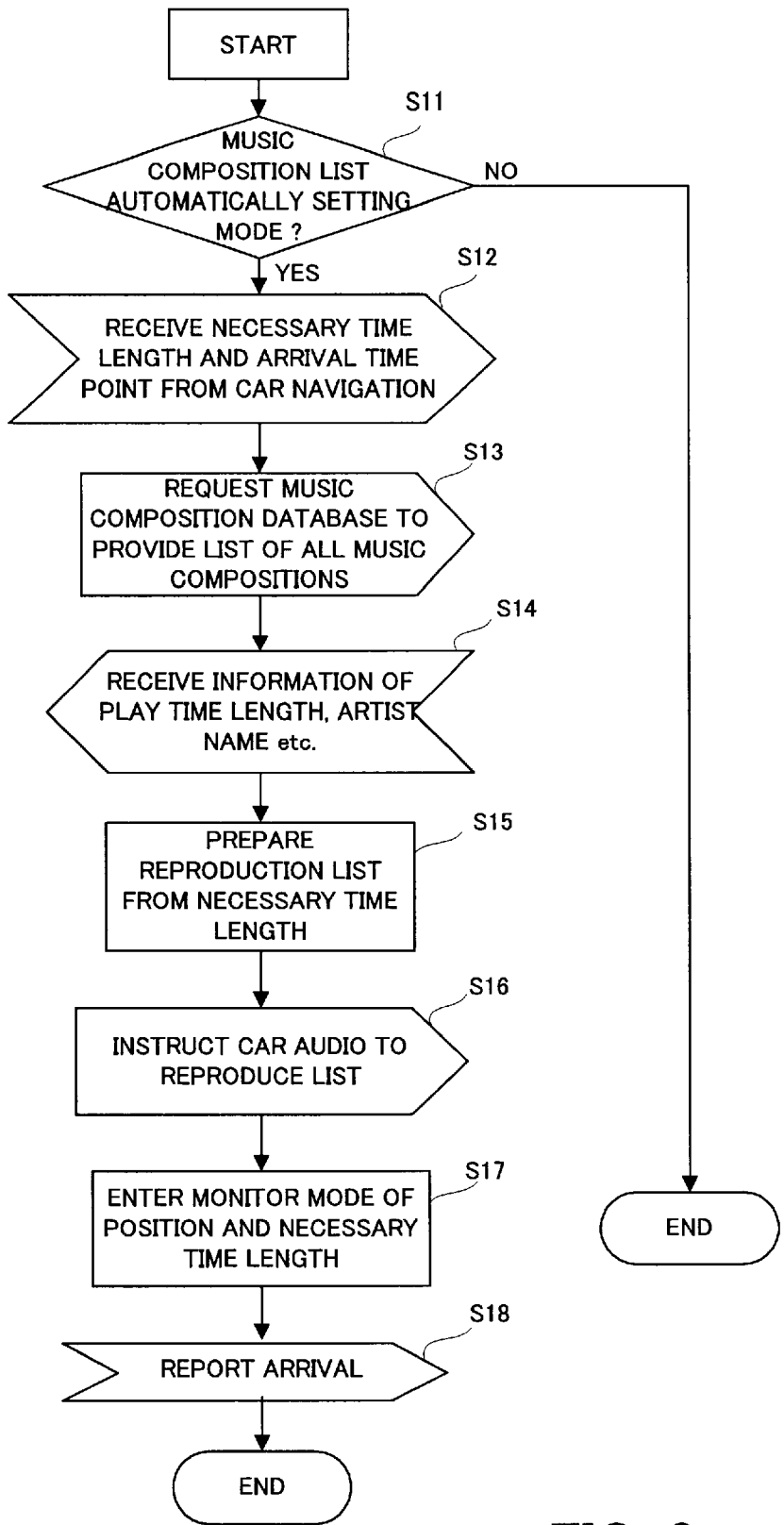
FIG. 3 is a flowchart showing operations in the first embodiment.
Figure 4:
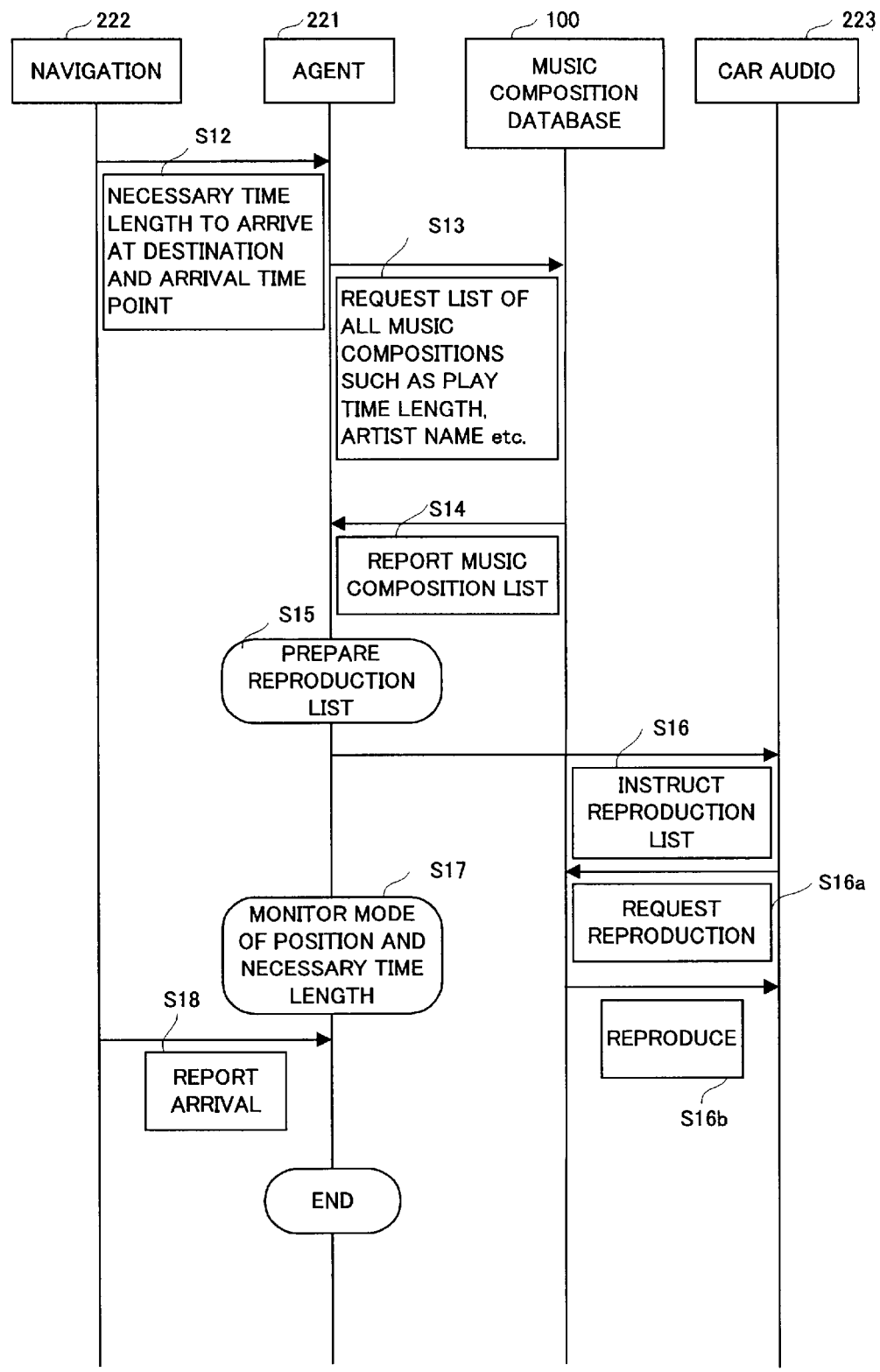
FIG. 4 is a sequence chart temporally showing the operations in the first embodiment shown in FIG. 3, respectively, with regard to a navigation system, an agent, a music composition database and a car audio system.

A process of preparing a music composition list in accordance with a necessary time length required to arrive at a destination, in the on-vehicle electronic system of the first embodiment having the above-mentioned configuration, will be described below with reference to a flowchart in FIG. 3 and a sequence chart in FIG. 4. In this embodiment, as conceptually shown in FIG. 4, an agent 221 for preparing a music composition list in accordance with a necessary time length required to arrive at a destination is logically established within the CPU 22. By the way, FIG. 4 conceptually shows a navigation system (navigation) 222 and a car audio system (car audio) 223 composed of the CPU 22 and the like, together with the music composition database 100 (refer to FIG. 2) and the agent 221. FIG. 4 shows between which of the two constitutional elements among those four constitutional elements the process at each step in FIG. 3 is carried out, or by which constitutional element the process is carried out. More concretely, as for the processes carried out between the two constitutional elements among those four constitutional elements, the orientations of the arrows drawn between the longitudinal lines extending from any one of those four constitutional elements indicate the orientations of the processes, and the process contents are indicated below the respective arrows together with the step numbers corresponding to FIG. 3. Then, the process to be singly done by any one of those four constitutional elements is indicated on the longitudinal line extending from those four constitutional elements. Moreover, in FIG. 4, the temporal flow of the process advances from the upper side to the lower side.

In FIG. 3 and FIG. 4, if a destination is set for the navigation system 222 through the input device 60 (refer to FIG. 1) when the self-car starts traveling, the navigation system 222 firstly calculates an expected necessary time length (i.e., an expected necessary time duration), which is required to arrive at the destination from a current position, and an expected arrival time. Together with them, the navigation system 222 calculates an optimal route for the destination, and further calculates expected pass time points (i.e., expected pass moment) at a plurality of geographical positions on the route, expected pass geographical positions at a plurality of times and the like. In this way, on the premise that at least the expected pass geographical positions at a plurality of time points are calculated by the navigation system 222, the agent 221 judges whether or not it is in a music composition list automatically setting mode (Step S11). Here, "Music Composition List Automatically Setting Mode" is the mode of selecting a music composition group to be reproduced until the arrival at the destination, in accordance with the expected necessary time length until the arrival at the destination, and automatically preparing the music composition list. For example, this mode is set by pushing a mode selection button in the input device 60 and the like, or by using a voice input. By the way, besides the music composition list automatically setting mode, for example, a mode of manually preparing the music composition list, a mode of not preparing the music composition list and the like may be set. The agent 221 stores therein the information indicative of the expected necessary time length, the expected pass time point or points, the expected pass geographical position or points and the like, which are calculated by the navigation system 222.

Here, if the music composition list automatically setting mode is not set (Step S11: No), the agent 221 ends the process of preparing the music composition list.

On the other hand, if the music composition list automatically setting mode is set (Step S11: Yes), the agent 221 receives the data indicative of the expected necessary time length and the expected arrival time from the navigation system 222 (Step S12).

In succession, the agent 221 requests the music composition database 100 (refer to FIG. 2) established in the hard disc device 36 to provide the list of all music compositions stored in the music composition list database (Step S13).

In accordance with the request of the music composition list from the agent 221, the music composition database 100 reports the music composition list, and the agent 221 receives the information (refer to FIG. 2) indicative of a play time length that is an example of an output time length information, an artist name and the like (Step S14). By the way, the output time length information may include a play time length with regard to any unit, such as a play time length of an album unit, a play time length of a set of albums or the like, in addition to a play time length of a music composition unit.

Next, the agent 221 functioning as an example of a selecting device, while referring to the play time length received from the music composition database 100 as mentioned above, selects a music composition group to be reproduced during the traveling to the destination, on the basis of the expected necessary time length, and prepares a reproduction list or a music composition list indicative of one or a plurality of selected music compositions (Step S15). In succession, the agent 221 also functioning as an example of an output controlling device instructs the car audio system 223 to reproduce the music compositions in accordance with the prepared music composition list (Step S16). If there is not a specially indicated item when this music composition list is prepared, the reproducing order may be established so as to complete the reproduction in time to the expected necessary time length. For example, if the necessary time length is calculated as 45 minutes, it selects a music album ending in about 40 to 45 minutes, and if the necessary time length is calculated as two hours, it selects an album set ending in about one hour and 50 minutes. Or, if the necessary time length is calculated as 45 minutes, the music composition list may be prepared so as to remove several music compositions randomly or on the basis of past usage and the like from a music composition album corresponding to one hour. On the contrary, if the necessary time length is calculated as one hour, the music composition list corresponding to one hour may be prepared by adding the songs of the same artist to the song album corresponding to 45 minutes. Moreover, the music composition list may be prepared so as to prepare the set of music compositions of the same artist in which they are not collected as an album and the like and they are dispersed and stored.

The car audio system 223 receiving the music composition list requests the audio information (the content information) which is stored in the hard disc device 36 together with the music composition database 100 or in correlation with it, in the order of the music composition list (Step S16*a* of FIG. 4). The car audio system 223 sequentially reproduces the audio information provided by the music composition database 100 in response to that request (Step S16*b* of FIG. 4).

During the traveling after that, the reproduction is continued in accordance with the music composition list prepared at the step S15. The agent 221 proceeds to a mode of monitoring (i) the position during the traveling and (ii) the necessary time length (Step S17). That is, it compares the current time point with the scheduled pass time point or points at a predetermined geographical position or positions on the route calculated by the navigation system 222 when the self-car actually passes through the geographical position, and monitors whether the traveling state is behind or ahead of the schedule. Or, it compares the current position (i.e., the current geographical position) with the scheduled pass geographical position or positions at a predetermined time point or points calculated by the navigation system 222, actually at the predetermined time point, and then monitors whether the traveling state is behind or ahead of the schedule.

If the travel is completed on the schedule, the series of processes is completed after the agent 221 receives an arrival report from the navigation system 222 (Step S18) when the self-car actually arrives at the destination. At this time, in particular, if the content information corresponding to the necessary time length calculated by the navigation system 222 is outputted inside the car during the traveling and when the car arrives at the destination, this output of the content information is completed or the output of the content information is ended at a timing of a suitable interruption.

As mentioned above, according to the first embodiment, in the on-vehicle electronic system including the car audio system 223 as the example of the information outputting apparatus and the navigation system 222 as the example of the navigation apparatus, the usage of the agent 221 enables the output of the audio information as the example of the content information appropriate for the traveling state of the self-car.

By the way, this embodiment and the respective embodiments as described later are designed such that the content information selected on the basis of the expected necessary time length is used as the audio information to output the music composition. However, they may be designed so as to reproduce by selecting the content information including both of the audio information and the video information, or may be designed so as to reproduce by selecting the content information composed of only the video information without any audio information. Moreover, they may be designed so as to reproduce by selecting the content information composed of a story recorded on a tape, an electronic book or the like. Or, they may be designed so as to output the voice and the picture by referring to a built-in clock and also considering the current time point and then selecting a television program or a radio program ending within the expected necessary time length.

In addition, the first embodiment may be designed such that a music composition and a picture belonging to a favorite artist or a favorite genre preset on the basis of the taste of a driver or a fellow passenger are set in advance as the condition narrowed down for the selection, and that, only those satisfying the narrowed down condition may be requested at the step S13 or only those satisfying the narrowed down condition may be selected at the step S15. For example, if an artist name, a genre name, an album name, a taste of a user, a travel purpose, a kind of a fellow passenger and the like are inputted as the narrowed down condition by using the input device 60 (refer to FIG. 1), the agent 221 then selects the content information on the basis of the narrowed down condition in addition to the expected necessary time length calculated by the navigation system 222. Thus, the content information is outputted which corresponds to the taste of the driver and the fellow passenger and also corresponds to the necessary time length. For example, it is possible to reproduce only the music compositions belonging to the favorite artist and genre, or preferentially reproduce a music composition desired to be heard as a family, or always reproduce a music composition desired to be played as the first music composition to be played.

Moreover, the embodiment may be designed so as to automatically set the above-mentioned narrowed down condition, on the basis of the history information with regard to the music compositions previously outputted by the car audio system 223. In this case, as the narrowed down condition, for example, the artist name, the genre name, the album name, the taste, the travel purpose, the kind of the fellow passenger and the like are set on the basis of the history information with regard to the content information previously outputted by the car audio system 223. Then, the embodiment may be designed such that only those satisfying the narrowed down condition may be requested at the step S13 or only those satisfying the narrowed down condition may be selected at the step S15.

In case that the narrowed down condition is inputted or set as mentioned above, with respect to the music composition corresponding to the taste in the music composition database 100, a tag indicative of it may be given in advance. Then, on the basis of the tag, the retrieval may be performed by the music composition database 100, or the selection may be performed by the agent 221.

(Second Embodiment)

Figure 5:
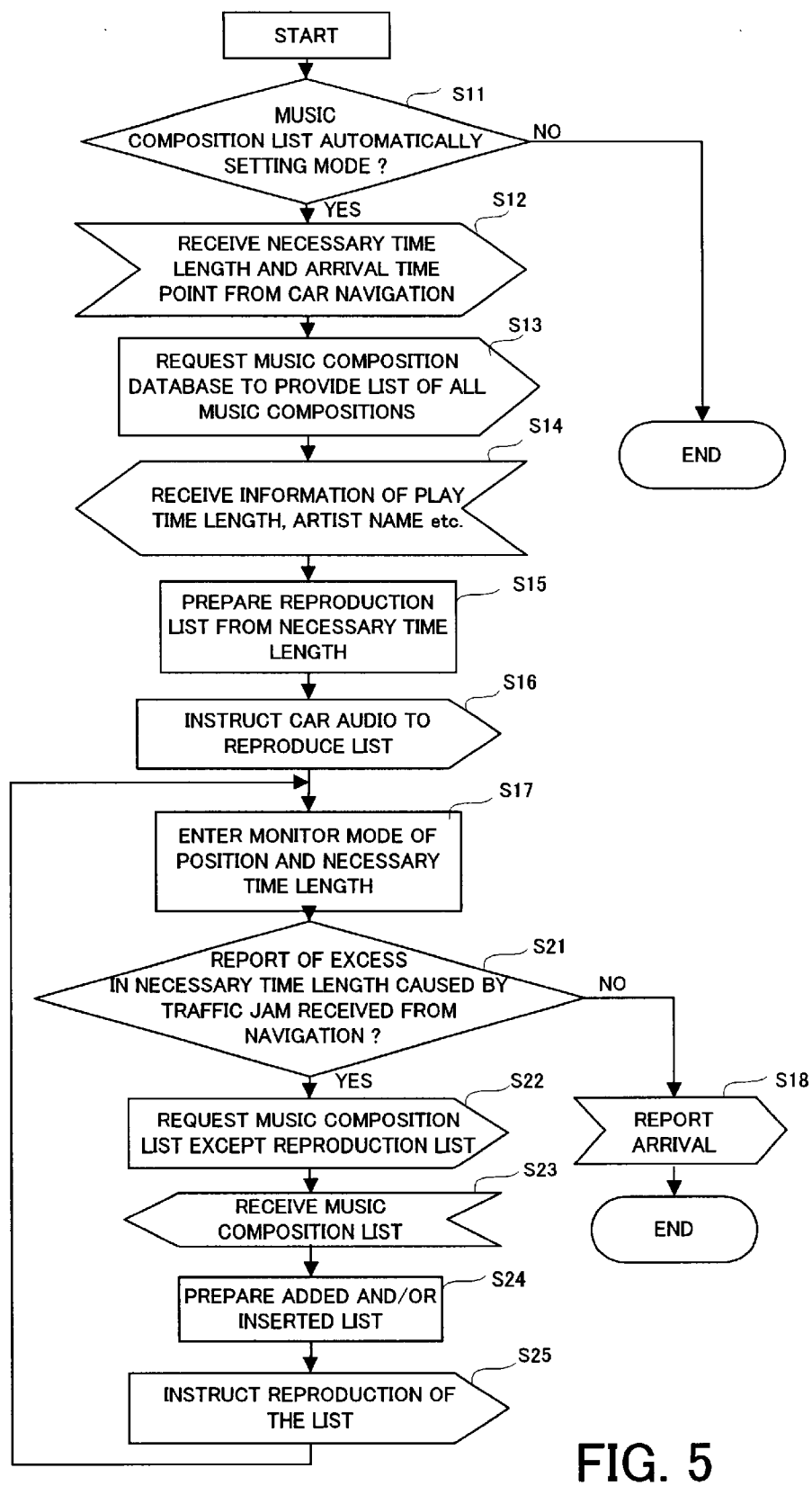
FIG. 5 is a flowchart showing operations in a second embodiment of the present invention.
Figure 6:
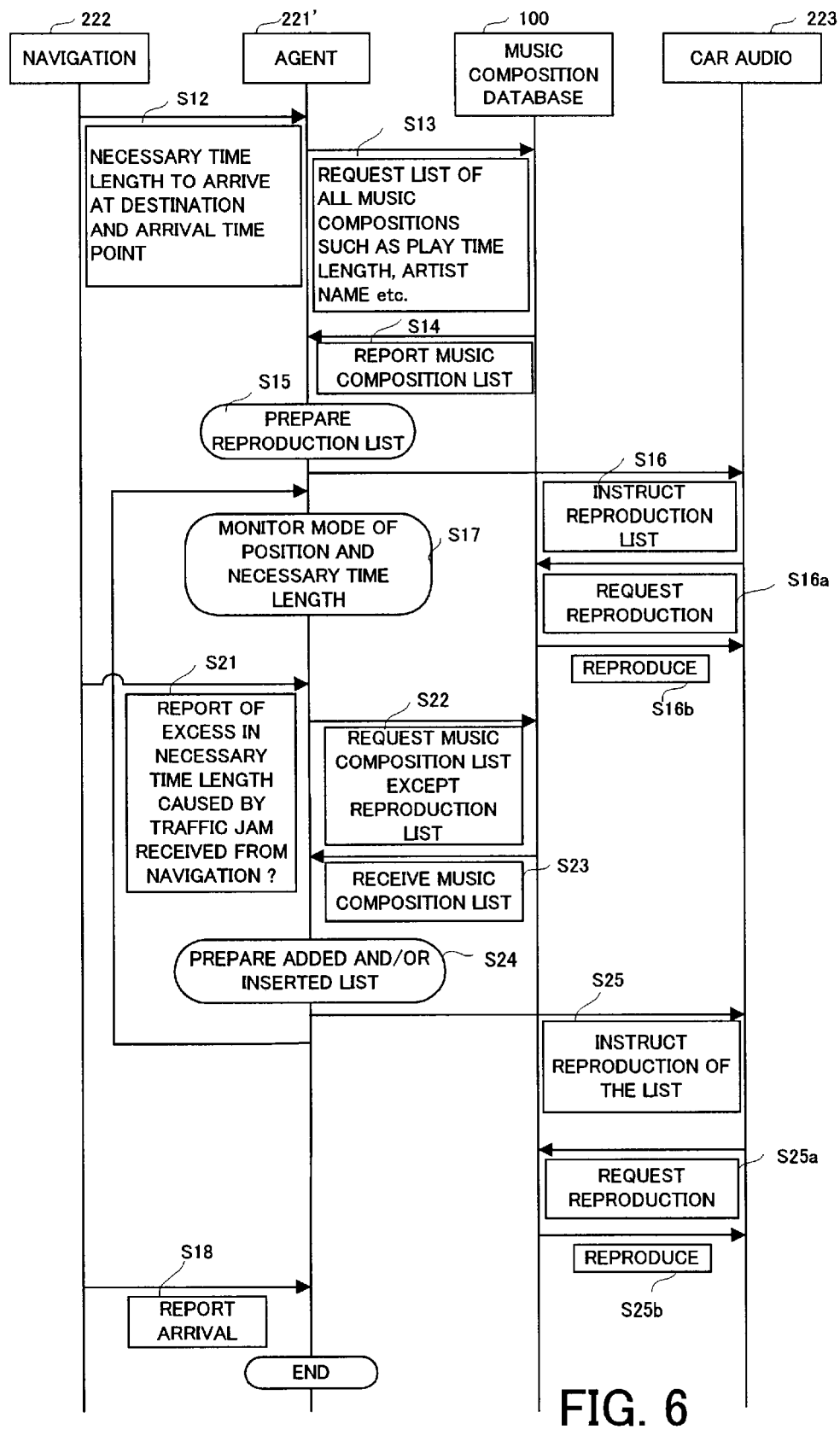
FIG. 6 is a sequence chart temporally showing the operations in the second embodiment shown in FIG. 5, respectively, with regard to the navigation system, the agent, the music composition database and the car audio system.

A second embodiment of the present invention will be described below with reference to FIG. 5 and FIG. 6. Here, FIG. 5 is a flowchart showing the operations in the second embodiment. FIG. 6 is a sequence chart temporally showing the operations in the second embodiment shown in FIG. 5, respectively, with regard to the navigation system, the agent, the music composition database and the car audio system, similarly to FIG. 4. By the way, the hardware configuration in the second embodiment is similar to that of the first embodiment shown in FIG. 1. In FIG. 5 and FIG. 6, the same steps as those in FIG. 3 and FIG. 4 carry the same step numbers, and the explanations thereof are suitably omitted.

The second embodiment is designed such that an agent 221' constituting an example of a selecting device changes the content information to be outputted after a current time point, if the traveling state of the self-car is not on the schedule based on the monitor result in the monitor mode at the step S17, in addition to the function of the agent 221 in the first embodiment. The other configurations are similar to those of the first embodiment.

That is, as shown in FIG. 5 and FIG. 6, in the second embodiment, the processes at the steps S11 to S17 are firstly carried out, similarly to the case of the first embodiment.

After the operational flow proceeds to the monitor mode at the step S17, the agent 221' firstly checks whether or not a report indicating that a traffic jam or snarl causes the excess in the expected necessary time length is received from the navigation system 222 (Step S21).

Here, if the report is not received (Step S21: No), this implies the case that the traveling is completed on the schedule. Thus, when the self-car actually arrives at the destination, the agent 221' receives the arrival report from the navigation system 222 (Step S18), and the series of processes is completed. Hence, if the content information appropriate for the necessary time length calculated by the navigation system 222 is outputted inside the car during the traveling and when the car arrives at the destination, this output of the content information is completed or the output of the content information is ended at a timing of a suitable interruption.

On the other hand, if the report indicative of the excess in the expected necessary time length caused by the traffic jam is reported from the navigation system 222 (Step S21: Yes), the operational flow proceeds to a process of changing the content information to be outputted after a current time point. Actually, the agent 221' requests the music composition database 100 to provide a music composition list which is not included in the current music composition list or reproduction list (Step S22). In response to this request, the agent 221' receives the music composition list outputted by the music composition database 100 (Step S23). Moreover, the agent 221' functioning as an example of a selecting device prepares a music composition list to be added and inserted in accordance with the excessive necessary time length (Step S24). Here, for example, with using a music composition album under reproduction as a standard, the music composition belonging to the same artist or the same genre is inserted into the play list or added to a tail. Then, the agent 221' also functioning as an example of an output controlling device instructs to the car audio system 223 the additional reproducing order on the basis of the added and/or inserted list (Step S25). The car audio system 223 receiving this instruction requests the audio information stored in the hard disc device 36 together with the music composition database 100 or in correlation with it, in the order of the music composition list (Step lo S25a of FIG. 6). The car audio system 223 sequentially reproduces the audio information provided by the music composition database 100 in response to the request (Step S25b of FIG. 6). After that, the operational flow returns back to the step S17, and it continues the monitor in the monitor mode.

Thus, according to the second embodiment, even if the traffic jam or snarl disables the traveling to be done on the schedule, the content information appropriate for the traveling state is outputted inside the car. When the car arrives at the destination, the output of the content information is completed, or the output of the content information is ended at a timing of a suitable interruption.

By the way, the second embodiment is designed so as to carry out the process of adding a music composition to the music composition list if the report indicative of the excess in the necessary time length caused by the traffic jam is received from the navigation system 222 at the step S21. It may be designed such that in the monitor mode (Step S17), the agent 221' compares the scheduled pass time point, at the predetermined geographical position on the route calculated by the navigation system 222, with the current time point obtained by the built-in clock or the like, when the car actually passes through the geographical position and if the traveling state (i.e. the progress of the self-car) is behind the schedule by a predetermined time or more, the operational flow proceeds to the process at the step S22. Moreover, it may be designed such that if the traveling state (i.e. the progress of the self-car) is ahead of the schedule by a predetermined time or more as the comparison result, such a change that the operation for removing from the music composition list the music composition that is not heard since the driver skips it during the reproduction although it was previously contained in the list, may be added to the content information to be outputted during the remaining travel, for example. Or, the agent 221' may compare the current position and the scheduled pass geographical position at the predetermined time point calculated by the navigation system 222, with the predetermined time point obtained from the built-in clock or the like, and thereby judge whether the traveling state is behind or ahead of the schedule.

In addition, the second embodiment is designed so as to carry out the process of changing the content information itself to be outputted during the traveling if the traveling can not be done on the schedule. However, instead of it or in addition to it, the second embodiment may be designed such that the agent 221' functioning as the example of the output controlling device controls the car audio system 223 so as to change the output method after the current time point. For example, if the self-car is expected to arrive at the destination earlier than the schedule, the content information being reproduced may be fast-forwarded or reproduced at double speed. Or, if the self-car is expected to arrive at the destination later than the schedule, the content information being reproduced may be set at a static state or reproduced at slow speed.

(Third Embodiment)

Figure 7:
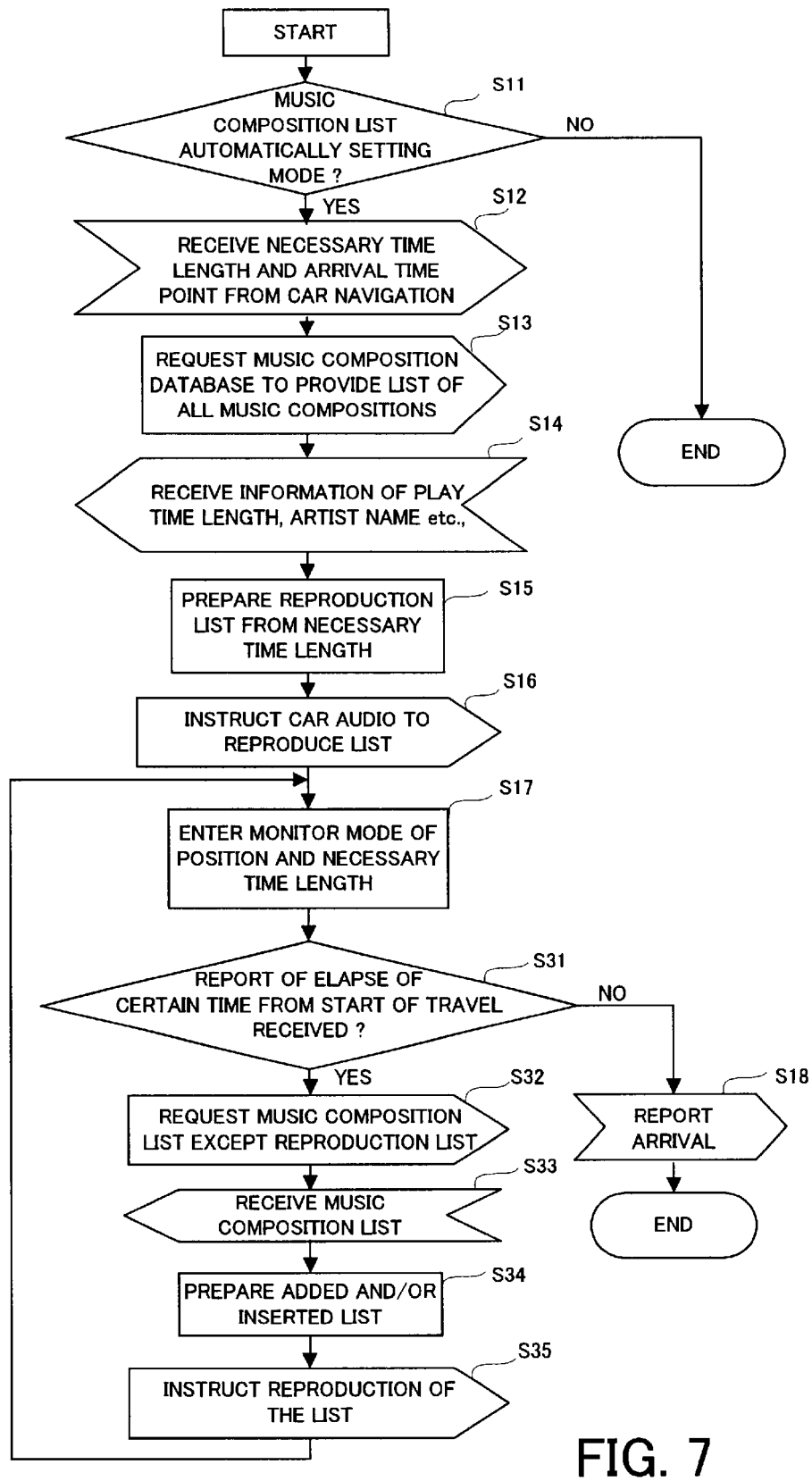
FIG. 7 is a flowchart showing operations in a third embodiment of the present invention.
Figure 8:
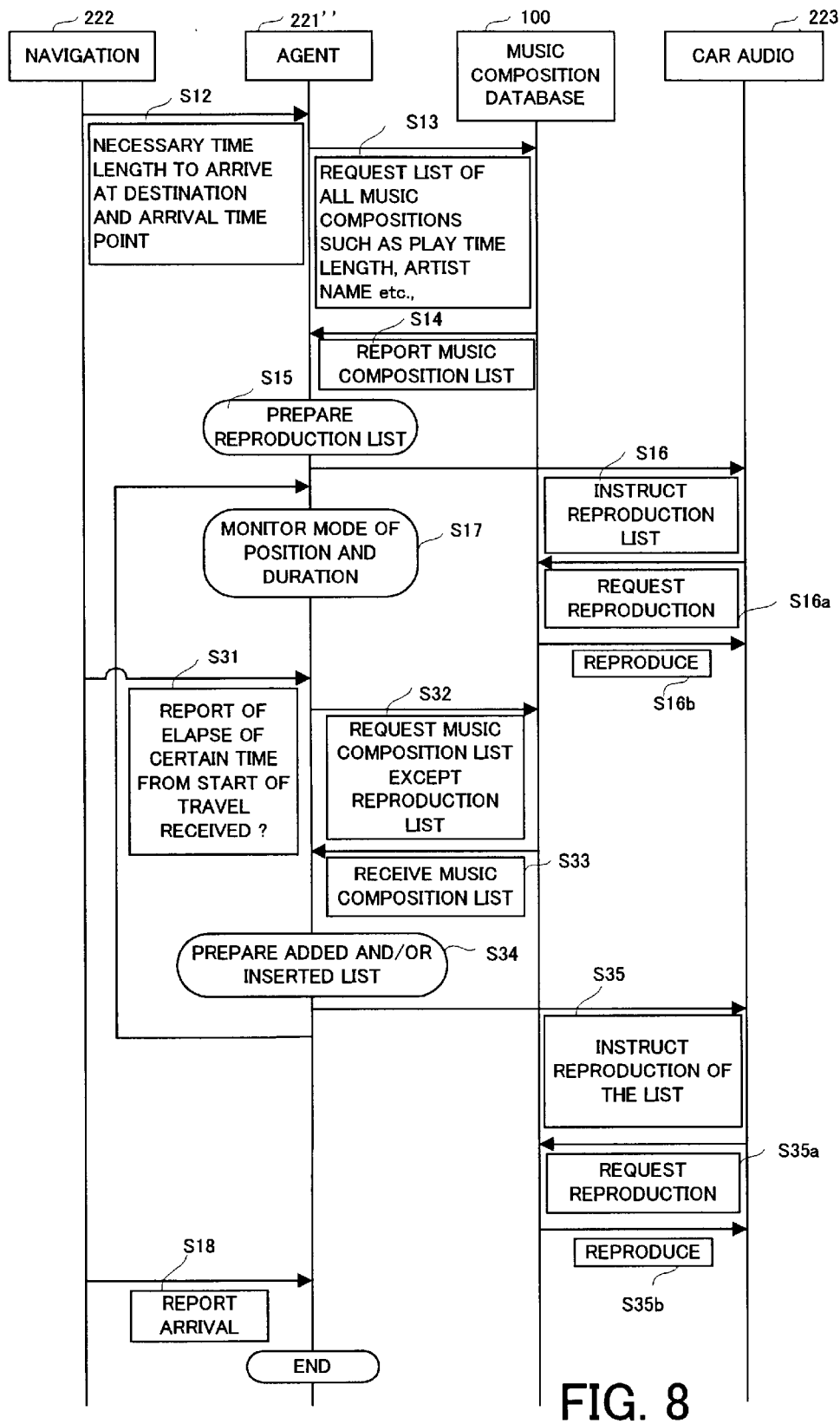
FIG. 8 is a sequence chart temporally showing the operations in the third embodiment shown in FIG. 7, respectively, with regard to the navigation system, the agent, the music composition database and the car audio system.

A third embodiment of the present invention will be described below with reference to FIG. 7 and FIG. 8. Here, FIG. 7 is a flowchart showing the operations in the third embodiment. FIG. 8 is a sequence chart temporally showing the operations in the third embodiment shown in FIG. 7, respectively, with regard to the navigation system, the agent, the music composition database and the car audio system, similarly to FIG. 4. By the way, the hardware configuration in the third embodiment is similar to that of the first embodiment shown in FIG. 1. In FIG. 7 and FIG. 8, the same steps as those in FIG. 3 and FIG. 4 carry the step numbers, and the explanations thereof are suitably omitted.

The third embodiment is designed such that in addition to the function of the agent 221 in the first embodiment, an agent 221" constituting the example of the selecting device functions as an example of a situation detecting device for detecting a predetermined kind of a special situation, for example, a situation at which a driver or a fellow passenger is tired, or a situation at which a driver feels sleepy, or the like, while the self-car is traveling, and further functions as the example of the output controlling device for controlling the car audio system 223 so as to preferentially output the content information preset as an output information in a case of the special situation, irrespectively of a result of the automatic selection of the music composition list, if such a special situation is detected. The other configurations are similar to those of the first embodiment.

That is, as shown in FIG. 7 and FIG. 8, in the third embodiment, the processes at the steps S11 to S17 are firstly carried out, similarly to the case of the first embodiment.

After the operational flow proceeds to the monitor mode at the step S17, the agent 221" firstly checks whether or not a report indicative of an elapse of a certain time (for example, two hours) from a start of the traveling is received from the navigation system 222 (Step S31).

Here, if the report is not received (Step S31: No), this implies the case that the traveling is completed in a relatively short time. Thus, when the self-car actually arrives at the destination, the agent 221" receives the arrival report from the navigation system 222 (Step S18), and the series of processes is completed. Hence, if the content information appropriate for the necessary time length calculated by the navigation system 222 is outputted inside the car during the traveling and when the car arrives at the destination, the output of the content information is completed or the output of the content information is ended at a timing of a suitable interruption.

On the other hand, if the agent 221" receives from the car audio system 223 the report indicative of the elapse of the certain time from the start of the traveling (Step S31: Yes), this implies the detection of the situation of a continuous travel in a long time. It fictionalizes that this situation is the special situation at which the driver or the like is tired. Then, the operational flow proceeds to a process of changing the content information so as to output a music composition for alleviating the fatigue, which is preset for the sake of the special situation. Actually, the agent 221" requests the music composition database 100 to provide a particular music composition list preset for the sake of the special situation, which is a list of music compositions that are not contained in a current music composition list or reproduction list (Step S32). Here, for example, a music composition for alleviating the fatigue as a default value in accordance with a typical viewpoint of a human physiology is preset for the special situation at which the driver or the like is tired. Or, a music composition for alleviating the fatigue on the basis of the judgment of the driver or the like is preset through the input device 60. For example, in accordance with this setting, a tag of "Music Composition Desired to Be Heard When Tired" or "Music Composition to Shake Off Sleepiness" is given to the music composition for the special situation in the music composition database 100.

The agent 221" receives the music composition list which is outputted from the music composition database 100 in response to the request of the music composition list, and for example, to which, the tag corresponding to the setting for the special situation is given (Step S33). In succession, the agent 221" functioning as the example of the selecting device prepares a new music composition list by adding and inserting this received music composition list (Step S34). Here, for example, the list is again edited such that the music composition for the special situation is reproduced after the music composition currently being reproduced. Then, the agent 221" also functioning as the example of the output controlling device gives an adding and reproducing order to the car audio system 223, in accordance with the added and/or inserted list (Step S35). The car audio system 223 receiving it requests the audio information stored in the hard disc device 36 together with the music composition database 100 or in correlation with it, in the order of the music composition list (Step S35a of FIG. 8). The car audio system 223 sequentially reproduces the audio information provided by the music composition database 100 in response to the request (Step S35b of FIG. 8). After that, the operational flow returns back to the step S17, and it continues the monitor in the monitor mode.

Thus, according to the third embodiment, in the special situation, the music composition corresponding to the special situation instead of the music composition selected in accordance with the necessary time length is outputted to the driver and the like. Hence, it is possible to attain the on-vehicle environment that is comfortable for the driver and the like and superior in security. By the way, although only one special situation may be set, a plurality of special situations can be set. Also, the timing when the output from the car audio system 223 is switched to the music composition for the special situation may be designed such that it is instantly switched when the agent 221" detects the special situation without waiting for the completion of the music composition currently being outputted.

As mentioned above, in the third embodiment, the detection is carried out by assuming that the continuous travel of the certain time or more is the situation at which the driver or the like is tired, as the example of the special situation. However, it may be designed to detect the special situation, on the basis of the degree of the traffic jam on the route over which the self-car is already traveling. For example, the detection may be carried out by assuming that the situation of the continuous travel after the traffic jam of the predetermined time or more is the special situation at which the driver or the like is tired or irritated.

Moreover, the detection may be carried out by assuming that a situation at which a traveling locus of the self-car is abnormal with respect to a predetermined standard, for example, a traveling locus such as a meandering drive, an emergently handling action or the like is a special situation at which the driver feels sleepy, on the basis of the measurement data in the navigation system 222. In this case, the music composition to shake off the sleepiness may be preset as the music composition for the special situation.

In addition, the third embodiment is designed so as to carry out the process of changing the content information itself to be outputted during the traveling, if the special situation is detected. However, instead of it or in addition to it, the third embodiment may be designed so as to control the car audio system 223 so that the agent 221" functioning as the example of the output controlling device changes the output method after a current time point. For example, a tone volume may be dropped at the situation at which the driver is tired. Or, the tone volume may be increased at the situation at which the driver feels sleepy.

By the way, the third embodiment is designed so as to preferentially reproduce the music composition preset for the sake of the special situation, in the case of the occurrence of the special situation, with respect to the music composition list automatically prepared on the basis of the expected necessary time length. However, it may be designed so as to preferentially reproduce the music composition preset for the sake of the special situation, when the special situation is detected, in any situation (for example, a situation at which a radio or CD is heard without any automatic setting of the music composition list), independently of the music composition list corresponding to the expected necessary time length. Even if it is designed as mentioned above, for example, at the situation that the driver is tired or feels sleepy, the music composition corresponding to that situation is outputted. Thus, this is convenient.

(Modified Embodiments)

The above-mentioned respective embodiments describe the example in which the content information is composed of the audio information, for the convenience of the explanation. However, the present invention can be similarly applied, as long as the content information is divided at a definitely temporal unit or completed within a definite time, even if the content information is the video information or the combination of the audio information and the video information and it is further text information (or video information made into a text) and the like.

For example, if the on-vehicle electronic system of the present invention is applied to a case in which the video information is given to a fellow passenger of a back seat or an assistant seat, it is possible to prepare a video list corresponding to the expected necessary time length. More concretely, in a case of a movie, a movie that is stored in a DVD list or a hard disc and can be viewed within the necessary time length is automatically selected similarly to the first to third embodiments. In this case, if the self-car arrives at the destination earlier than the schedule, it may be designed such that the movie is completed in time to the arrival time by carrying out a double speed reproduction or a partially removed reproduction.

Also, if the on-vehicle electronic system of the present invention is applied to a case that the video information in relation to a live video is provided, a live video ending within the expected necessary time length is automatically selected. By the way, the video itself is selected from a list stored in the DVD list or the hard disc. On the contrary, if the live video ends within the expected necessary time length while a sufficient time is left, a music composition that is not included in an album of that artist can be extracted from the list and then inserted into the list. A picture displayed at this time may be a static picture or a dynamic picture that is not directly correlated to the music composition as BGM.

Moreover, if the on-vehicle electronic system of the present invention is applied to a case that the text information of a book (electronic book), a comic and the like is provided, a book that can be read within the necessary time length and the like are automatically selected.

The respective embodiments execute the process of selecting the content information within the on-vehicle electronic system. However, such a process can be also executed by using the communication device 38 within the on-vehicle electronic system and then communicating with a server on the Internet or the like. In this case, the agent virtually established within the on-vehicle electronic system in the above explanation (actually attained by the CPU 22 and its program) can be established on the server on the Internet and used as the server having the function of selecting the content information or the function of preparing the music composition list. The input information with regard to the destination indicated by the driver or the like, the favorite artist and genre, the music composition to be outputted at the time of the special situation and the like is sent through the communication device 38 to the server, and the server sends the corresponding music composition list and the like to the on-vehicle electronic system. Then, in the on-vehicle electronic system, the content information is outputted in accordance with this received music composition list and the like. In addition, even the navigation function with regard to a route research, a route guide and the like after the input of the destination can be executed while the communication device 38 is used to communicate with the server.

The electronic system for the movable body of the present invention can be applied not only to the on-vehicle electronic system of the respective embodiments but also to a navigation apparatus for a walker, which uses a portable information terminal, a portable telephone or the like. This case is allowable if the portable information terminal, the portable telephone and the like have the content reproducing function such as the music reproducing function and the like. For example, the necessary time length until the arrival at the destination is calculated on the basis of a speed of a walker and the like. Then, the desirable content information may be selected in accordance with the necessary time length.

As detailed above, according to the present invention, in the electronic system for the movable body which includes the information outputting apparatus for the movable body and the navigation apparatus for the movable body, such as the car audio system and the like, it is possible to output the audio information and/or the video information corresponding to the movement state of the movable body.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-175577 filed on Jun. 11, 2001 including the specification, claims, drawings and summary is incorporated herein by reference in its entirety.

What is claimed is:

1. A controlling apparatus for controlling an electronic system for a movable body, said electronic system comprising (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by said input device from a current position of said movable body, said controlling apparatus comprising:

a selecting device which selects the content information to be outputted during the movement of said movable body until the arrival at the destination, on the basis of a play time length of the content information, in response to the calculated necessary time length; and an output controlling device which controls said output device so as to output the content information selected by said selecting device during the movement of said movable body until the arrival at the destination.

2. The controlling apparatus according to claim 1, further comprising a monitoring device which monitors whether or not the movement of said movable body is on schedule, said selecting device applying a change onto the content information to be applied after a current time point if the movement of said movable body is not on schedule according to a monitor result of said monitoring device.

3. The controlling apparatus according to claim 2, wherein said calculating device further calculates scheduled pass time points at a plurality of geographical positions on a route of said movable body, said monitoring device monitors by comparing the scheduled pass time points with a current time point, and said selecting device applies the change onto the content information to be outputted after the current time point in correspondence with a comparison result of the monitoring device.

4. The controlling apparatus according to claim 2, wherein said calculating device further calculates scheduled pass positions at a plurality of time points, on a route of said movable body, said monitoring device monitors by comparing the scheduled pass positions with a current position, and said selecting device applies change onto the content information to be outputted after the current time point in correspondence with a comparison result of the monitoring device.

5. The controlling apparatus according to claim 1, further comprising a monitoring device which monitors whether or not the movement of said movable body is on schedule, said output controlling device controlling said output device to apply a change onto an output manner thereof after a current time point if the movement of said movable body is not on schedule according to a monitor result of said monitoring device.

6. The controlling apparatus according to claim 5, wherein said calculating device further calculates scheduled pass time points at a plurality of geographical positions on a route of said movable body, said monitoring device monitors by comparing the scheduled pass time points with a current time point, and said output controlling device controls said output device to apply the change onto the output manner thereof after the current time point in correspondence with a comparison result of the monitoring device.

7. The controlling apparatus according to claim 5, wherein said calculating device further calculates scheduled pass positions at a plurality of time points, on a route of said movable body, said monitoring device monitors by comparing the scheduled pass positions with a current position, and said output controlling device controls said output device to apply the change onto the output manner thereof after the current time point in correspondence with a comparison result of the monitoring device.

8. The controlling apparatus according to claim 1, further comprising a storage device which stores the play time length.

9. The controlling apparatus according to claim 8, wherein said storage device stores the content information in correlation with the play time length.

10. The controlling apparatus according to claim 1, wherein said input device is adapted to input a condition to narrow down the content information to be outputted during the movement of said movable body, and said selecting device selects the content information in correspondence with the condition inputted by said inputting device in addition to the necessary time length.

11. The controlling apparatus according to claim 1, further comprising a condition setting device which sets a condition to narrow down the content information to be outputted during the movement of said movable body, on the basis of history information related to the content information outputted in a past by said information outputting apparatus, said selecting device selecting the content information correspondence with the condition set by said condition setting device, in addition to the necessary time length.

12. The controlling apparatus according to claim 1, further comprising a situation detecting device which detects a special situation in a predetermined kind during the movement of said movable body, said output controlling device controlling said output device to preferentially output the content information set in advance as to be outputted at a time of the special situation regardless of a selection result by said selecting device, if the special situation is detected by said situation detecting device.

13. The controlling apparatus according to claim 1, wherein said selecting device generates a play list indicating a combination of a plurality of content information, which include a plurality of music compositions and/or pictures as the content information, and which are supposed to be completed during the movement of said movable body until the arrival at the destination.

14. The controlling apparatus for controlling according to claim 1, wherein said selecting device selects the content information, which is for a purpose of an audio and/or visual entertainment operation other than a navigation operation performed by said navigation apparatus, on the basis of the play time length, and said output device outputs, in the navigation operation, at least one of another audio information and another video information, which are different from the content information and which are for a purpose of the navigation operation.

15. A controlling apparatus for controlling an electronic system for a movable body, said electronic system comprising (i) an information outputting apparatus having an output device which outputs a content information including at least one of an audio information and a video information and (ii) a navigation apparatus having an measurement device which outputs a measurement data related to a movement condition of a movable body, said controlling apparatus comprising:

a situation detecting device which detects a special situation in a predetermined kind during the movement of said movable body, on the basis of the measurement data; and an output controlling device which controls said output device to preferentially output the content information, which is for a purpose of an audio and/or visual entertainment operation other than a navigation operation performed by said navigation apparatus, set in advance as to be outputted at a time of the special situation if the special situation is detected by said situation detecting device, wherein, in the navigation operation, said output device outputs at least one of another audio information and another video information which are different from the content information and which are for a purpose of the navigation operation.

16. The controlling apparatus according to claim 15, further comprising an input device through which the content information to be outputted can be inputted at the time of the special situation.

17. The controlling apparatus according to claim 15, wherein said situation detecting device detects the special situation by detecting that a continuous movement time length since a start of the movement of said movable body exceeds a predetermined time length.

18. The controlling apparatus according to claim 15, wherein said situation detecting device detects the special situation on the basis of a degree of a traffic jam on a route where said movable body has already traveled.

19. The controlling apparatus according to claim 15, wherein said situation detecting device detects the special situation by detecting that a traveling locus of said movable body is abnormal with respect to a predetermined reference.

20. A program storage device readable by a computer for tangibly embodying a program of instructions executable by the computer to perform method processes in an electronic system for a movable body, said electronic system comprising (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by said input device from a current position of said movable body, said method processes comprising:

a selecting process of selecting the content information to be outputted during the movement of said movable body until the arrival at the destination, on the basis of a play time length of the content information, in response to the calculated necessary time length; and an outputting process of outputting the content information selected by said selecting process during the movement of said movable body until the arrival at the destination.

21. The program storage device according to claim 20, wherein said selecting process is for selecting the content information, which is for a purpose of an audio and/or visual entertainment operation other than a navigation operation performed by said navigation apparatus, on the basis of the play time length; and said output device outputs, in the navigation operation, at least one of another audio information and another video information, which are different from the content information and which are for a purpose of the navigation operation.

22. A program storage device readable by a computer for tangibly embodying a program of instructions executable by the computer to perform method processes in an electronic system for a movable body, said electronic system comprising (i) an information outputting apparatus having an output device which outputs a content information including at least one of an audio information and a video information and (ii) a navigation apparatus having an measurement device which outputs a measurement data related to a movement condition of a movable body, said method processes comprising:

a situation detecting process of detecting a special situation in a predetermined kind during the movement of said movable body, on the basis of the measurement data; and an outputting process of preferentially output the content information, which is for a purpose of an audio and/or visual entertainment operation other than a navigation operation performed by said navigation apparatus, set in advance as to be outputted at a time of the special situation if the special situation is detected by said situation detecting process, wherein, in the navigation operation, said output device outputs at least one of another audio information and another video information which are different from the content information and which are for a purpose of the navigation operation.

23. A computer data signal embodied in a carrier wave and representing a series of instructions which cause a computer to perform method processes in an electronic system for a movable body, said electronic system comprising (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by said input device from a current position of said movable body, said method processes comprising:

a selecting process of selecting the content information to be outputted during the movement of said movable body until the arrival at the destination, on the basis of a play time length of the content information, in response to the calculated necessary time length; and an outputting process of outputting the content information selected by said selecting process during the movement of said movable body until the arrival at the destination.

24. The computer data signal according to claim 23, wherein said selecting process is for selecting the content information, which is for a purpose of an audio and/or visual entertainment operation other than a navigation operation performed by said navigation apparatus, on the basis of the play time length; and said output device outputs, in the navigation operation, at least one of another audio information and another video information, which are different from the content information and which are for a purpose of the navigation operation.

25. A computer data signal embodied in a carrier wave and representing a series of instructions which cause a computer to perform method processes in an electronic system for a movable body, said electronic system comprising (i) an information outputting apparatus having an output device which outputs a content information including at least one of an audio information and a video information and (ii) a navigation apparatus having an measurement device which outputs a measurement data related to a movement condition of a movable body, said method processes comprising:

a situation detecting process of detecting a special situation in a predetermined kind during the movement of said movable body, on the basis of the measurement data; and an outputting process of preferentially output the content information, which is for a purpose of an audio and/or visual entertainment operation other than a navigation operation performed by said navigation apparatus, set in advance as to be outputted at a time of the special situation if the special situation is detected by said situation detecting process, wherein in the navigation operation said output device at least one of another audio information and another video information which are different from the content information and which are for a purpose of the navigation operation.

26. An electronic system for a movable body comprising:

an information outputting apparatus having an output device which outputs a content information including at least one of an audio information and a video information;

a navigation apparatus having an input device through which a destination in a movement of a movable body can be inputted and a calculate device which calculates a necessary time length required for the movable body to arrive at the destination inputted by said input device from a current position of said movable body;

a selecting device which selects the content information to be outputted during the movement of said movable body until the arrival at the destination, on the basis of a play time length of the content information, in response to the calculated necessary time length; and an output controlling device which controls said output device so as to output the content information selected by said selecting device during the movement of said movable body until the arrival at the destination.

27. The electronic system according to claim 26, further comprising a communication device which down-loads at least one of the content information and the play time length.

28. The electronic system according to claim 26, wherein said selecting device generates a play list indicating a combination of a plurality of content information, which include a plurality of music compositions and/or pictures as the content information, and which are supposed to be completed during the movement of said movable body until the arrival at the destination.

29. The electronic system according to claim 26, wherein said selecting device selects the content information, which is for a purpose of an audio and/or visual entertainment operation other than a navigation operation performed by said navigation apparatus, on the basis of the play time length; and said output device outputs, in the navigation operation, at least one of another audio information and another video information, which are different from the content information and which are for a purpose of the navigation operation.

30. An electronic system for a movable body comprising;

an information outputting apparatus having an output device which outputs a content information including at least one of an audio information and a video information;

a navigation apparatus having an measurement device which outputs a measurement data related to a movement condition of a movable body;

a situation detecting device which detects a special situation in a predetermined kind during the movement of said movable body, on the basis of the measurement data; and an output controlling device which controls said output device to preferentially output the content information, which is for a purpose of an audio and/or visual entertainment operation other than a navigation operation performed by said navigation apparatus, set in advance as to be outputted at a time of the special situation if the special situation is detected by said situation detecting device, wherein in the navigation operation said output device outputs at least one of another audio information and another video information, which are different from the content information and which are for a purpose of the navigation operation.

31. The electronic system according to claim 30, wherein said electronic system further comprises a communication device which down-loads the content information.

32. A controlling method of controlling an electronic system for a movable body, said electronic system comprising (i) an information outputting apparatus having an output device which outputs a content information including at least one of an audio information and a video information and (ii) a navigation apparatus having an input device through which a destination in a movement of a movable body can be inputted and a calculate device which calculates a necessary time length required for the movable body to arrive at the destination inputted by said input device from a current position of said movable body, said controlling method comprising;

a selecting process of selecting the content information to be outputted during the movement of said movable body until the arrival at the destination, on the basis of a play time length of the content information, in response to the calculated necessary time length; and an outputting process of outputting the content information selected by said selecting process during the movement of said movable body until the arrival at the destination.

33. The controlling method according to claim 32, wherein said selecting process generates a play list indicating a combination of a plurality of content information, which include a plurality of music compositions and/or pictures as the content information, and which are supposed to be completed during the movement of said movable body until the arrival at the destination.

34. The controlling method according to claim 32, wherein said selecting process is for selecting the content information, which is for a purpose of an audio and/or visual entertainment operation other than a navigation operation performed by said navigation apparatus, on the basis of the play time length; and said output device outputs, in the navigation operation, at least one of another audio information and another video information, which are different from the content information and which are for a purpose of the navigation operation.

35. A controlling method of controlling an electronic system for a movable body, said electronic system comprising (i) an information outputting apparatus having an output device which outputs a content information including at least one of an audio information and a video information and (ii) a navigation apparatus having an measurement device which outputs a measurement data related to a movement condition of a movable body, said controlling method comprising:

a situation detecting process of detecting a special situation in a predetermined kind during the movement of said movable body, on the basis of the measurement data; and an outputting process of preferentially output the content information, which is for a purpose of an audio and/or visual entertainment operation other than a navigation operation performed by said navigation apparatus, set in advance as to be outputted at a time of the special situation if the special situation is detected by said situation detecting process, wherein, in the navigation operation, said output device outputs at least one of another audio information and another video information which are different from the content information and which are for a purpose of the navigation operation.

* * * * *